United States Patent [19]

Zak

[11] Patent Number: 5,021,907
[45] Date of Patent: Jun. 4, 1991

[54] GIMBAL SPRING FOR SUPPORTING A MAGNETIC TRANSDUCER AND MAKING ELECTRICAL CONTACT THEREWITH

[75] Inventor: Brian S. Zak, Bloomington, Minn.

[73] Assignee: Seagate Technology, Inc., Scotts Valley, Calif.

[21] Appl. No.: 448,689

[22] Filed: Dec. 11, 1989

[51] Int. Cl.⁵ .............................................. G11B 5/48
[52] U.S. Cl. ........................................................ 360/104
[58] Field of Search ......................................... 360/104

[56] References Cited

U.S. PATENT DOCUMENTS

| | | |
|---|---|---|
| 2,965,886 | 12/1960 | Mitchell . |
| 3,767,209 | 10/1973 | Seehawer . |
| 4,141,050 | 2/1979 | Wisely . |
| 4,245,267 | 1/1981 | Herman . |
| 4,449,155 | 5/1984 | Meier et al. . |
| 4,534,022 | 8/1985 | Leipnitz . |
| 4,630,158 | 12/1986 | Spash . |
| 4,645,280 | 2/1987 | Gordon et al. . |
| 4,651,243 | 3/1987 | Daste et al. . |

Primary Examiner—A. J. Heinz
Attorney, Agent, or Firm—Kinney & Lange

[57] ABSTRACT

A gimbal spring apparatus includes a cantilevered tongue having a side edge and a planar mounting surface for an adhesive connection to a magnetic disk head slider. The tongue has an upper surface, opposite to the mounting surface, with a dimple protrusion for point contact with a load beam. Tabs extend from the side edge and is positioned generally adjacent the dimple. The tabs extend below a geometric plane defined by the planar mounting surface and through the adhesive connection for electrical contact with the magnetic disk head slider. The contacts provide an electrical discharge path from the magnetic disk head slider to the gimbal spring for discharging static electricity generated between the slider and a magnetic recording surface.

18 Claims, 5 Drawing Sheets

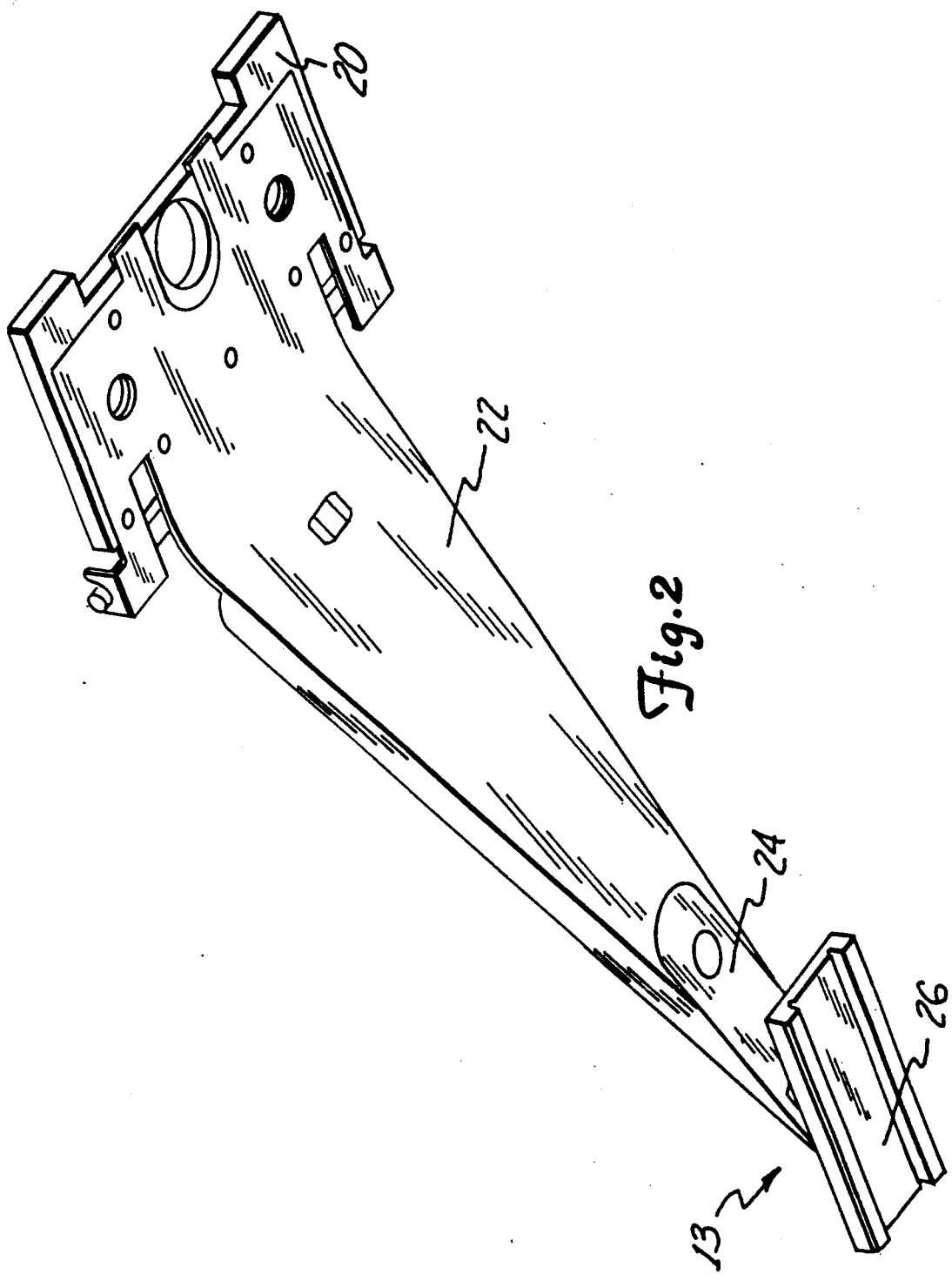

GIMBAL SPRING FOR SUPPORTING A MAGNETIC TRANSDUCER AND MAKING ELECTRICAL CONTACT THEREWITH

BACKGROUND OF THE INVENTION

1. Field of the Invention

The present invention relates to a gimbal spring for supporting a slider which carries a magnetic transducer over a rotating magnetic medium. More specifically, this invention relates to a gimbal spring that provides a conduction path from the slider to the gimbal spring for electrostatic discharge.

2. Description of the Prior Art

A gimbal spring is a critical element in a magnetic disk drive unit. Within the disk drive an actuator arm supports a slider which carries a magnetic transducer close to a rotating magnetic disk. The gimbal spring is positioned between the actuator arm and the slider. The gimbal spring resiliently supports the slider and allows it to move vertically and to pitch and roll while it follows the topography of the rotating disk. Typically, the gimbal spring is riveted to the actuator arm and is connected to the slider by an adhesive.

The adhesive connection tends to insulate electrically the slider from the gimbal spring. As the slider follows the topography of the rotating disk, electrostatic charge accumulates on the slider and impedes performance of read and write operations between the transducer and the magnetic disk. An electrical conduction path between the slider and the gimbal spring is needed to prevent the accumulation of charge by grounding the slider to the gimbal spring.

Attempts to provide a conduction path have included using a conductive epoxy as an adhesive. Conductive epoxy includes a mix of an epoxy and a conductive filler such as silver particles. These particles are in contact with one another and create a conductive chain between the slider and the gimbal spring. In order to create the conductive chain, the particles must be relatively large in size. As the gimbal spring is bonded to the slider, these large particles can prevent a parallel bond between the slider and the gimbal spring. In other words, the slider surface will not be parallel to the gimbal spring surface. This is a disadvantage because accurate positioning of the transducer over individual data tracks on the rotating magnetic disk is essential to disk drive performance. In addition, the filler particles used in conductive epoxy reduce the overall bond strength of the epoxy. Therefore, it is preferable to use adhesives that do not contain fillers so the connection is a strong, parallel bond.

Another method of providing a conduction path is to secure the slider to the gimbal spring with a nonconductive adhesive and then form conductive bridges which bridge the nonconductive adhesive connection. These conductive bridges can be formed by applying conductive epoxy across the adhesive connection. Forming each conductive bridge creates an extra manufacturing step and increases production cost.

The prior art lacks a simple method of grounding the slider across the adhesive connection between the slider and the gimbal spring.

SUMMARY OF THE INVENTION

The present invention is a gimbal spring which provides its own electrostatic conduction path to the slider even when secured to the slider by an nonconductive adhesive. The slider carries a magnetic transducer over a magnetic recording surface. In a preferred embodiment, the gimbal spring includes a cantilevered tongue having side edges and a planar mounting surface for adhesive connection to the slider. The tongue has an upper surface, opposite to the mounting surface, with a dimple protrusion for point contact with a load beam. At least one tab extends from the side edge and is positioned generally adjacent the dimple. The tab extends below a geometric plane defined by the planar mounting surface and extends through the adhesive connection for electrical contact with the slider. The contact creates the electrical conduction path from the slider to the gimbal spring which discharges static electricity generated between the slider and the magnetic recording surface.

BRIEF DESCRIPTION OF THE DRAWINGS

FIG. 2 is a perspective view of a load beam supporting the slider-gimbal assembly, as viewed from beneath the load beam in FIG. 1.

DETAILED DESCRIPTION OF THE PREFERRED EMBODIMENTS

Figure 1:
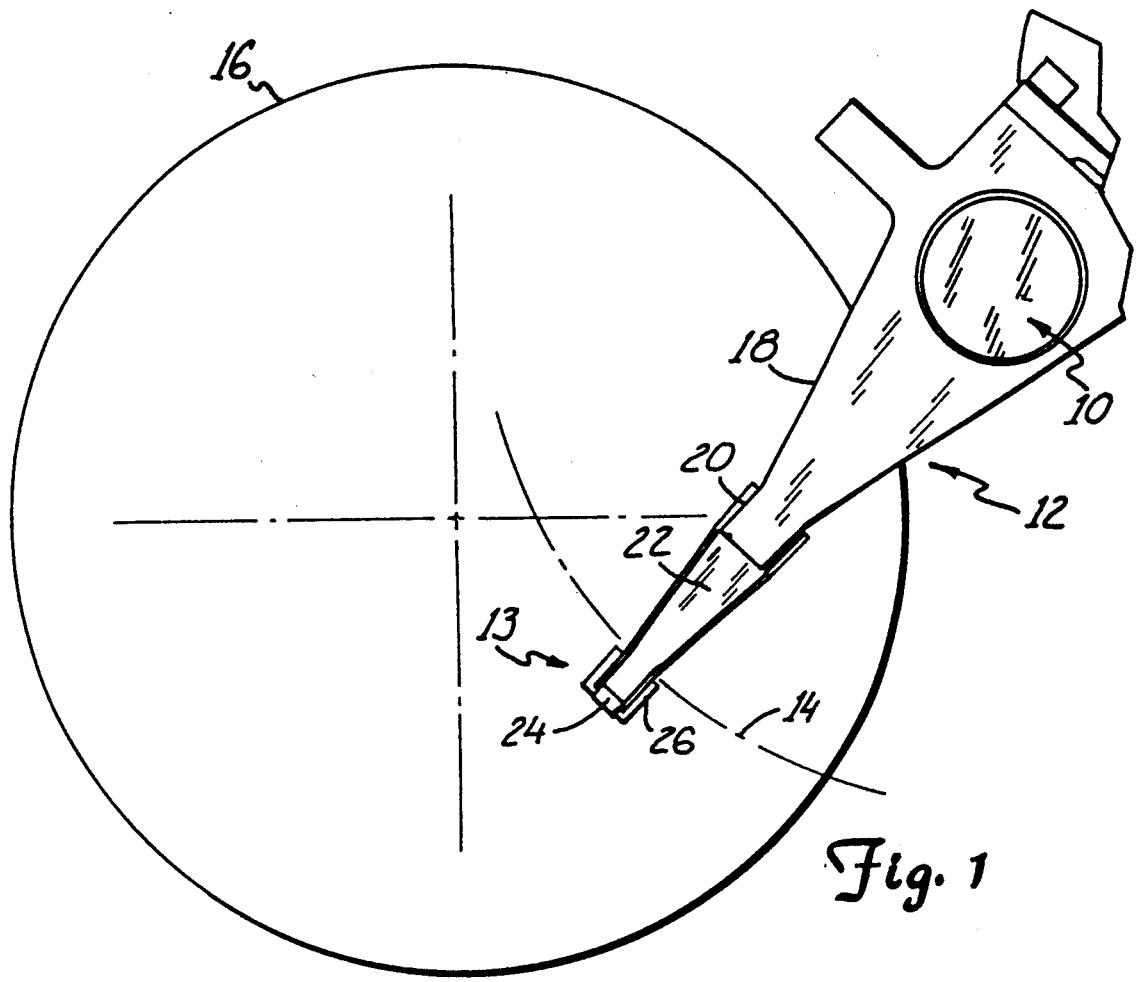
FIG. 1 is a plan view of an actuator arm supporting a slider-gimbal assembly over a magnetic disk.

FIG. 1 illustrates an actuator 10 and actuator arm 12 which supports a slider-gimbal assembly 13 over a magnetic disk 16. Actuator 10 positions arm 12 along arc 14 over magnetic disk 16. Arm 12 includes supporting arm 18, base plate 20, and load beam 22. Slider-gimbal assembly 13 includes gimbal spring 24 and slider 26. Arm 12 is known as a rotary actuating arm because actuator 10 rotates arm 12 to position slider 26 along arc 14.

FIG. 2 is a perspective view of load beam 22 supporting slider-gimbal assembly 13, as viewed from beneath load beam 22 in FIG. 1. Gimbal spring 24 resiliently supports slider 26 over disk 16. As disk 16 rotates, slider 26 flies above the surface of disk 16. Gimbal spring 24 allows slider 26 to pitch and roll while slider 26 follows the topography of disk 16.

Figure 3:
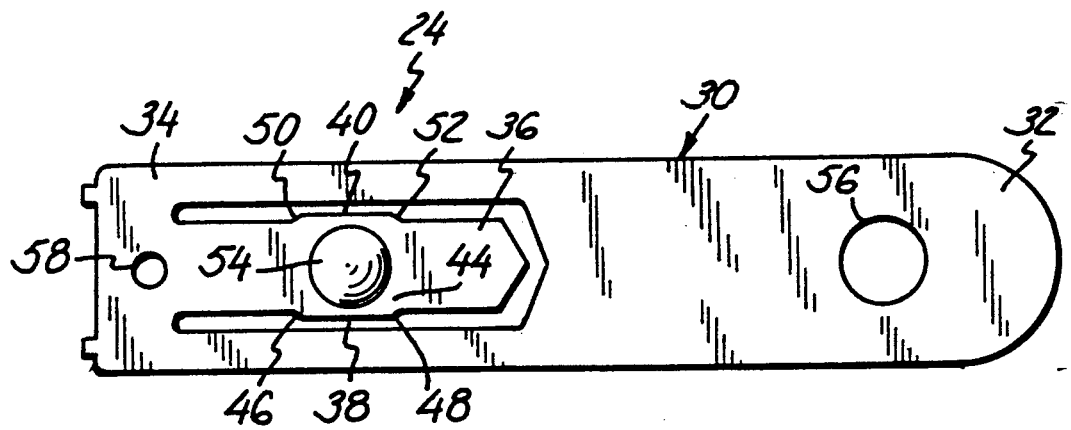
FIG. 3 is an enlarged plan view of a gimbal spring in accordance with the present invention.

FIG. 3 is an enlarged plan view of gimbal spring 24 which includes a resilient, elongated member 30 having a rearward portion 32 and a forward portion 34. A cantilevered tongue 36 is cut from a central region of forward portion 34. Tongue 36 includes a central pad 44 having tabs 38 and 40 with corners 46, 48, 50 and 52. Dimple protrusion 54 is formed from central pad 44 for point contact with load beam 22 (shown in FIG. 5). Apertures 56 and 58 are provided for aligning gimbal spring 24 with load beam 22.

Figure 4:
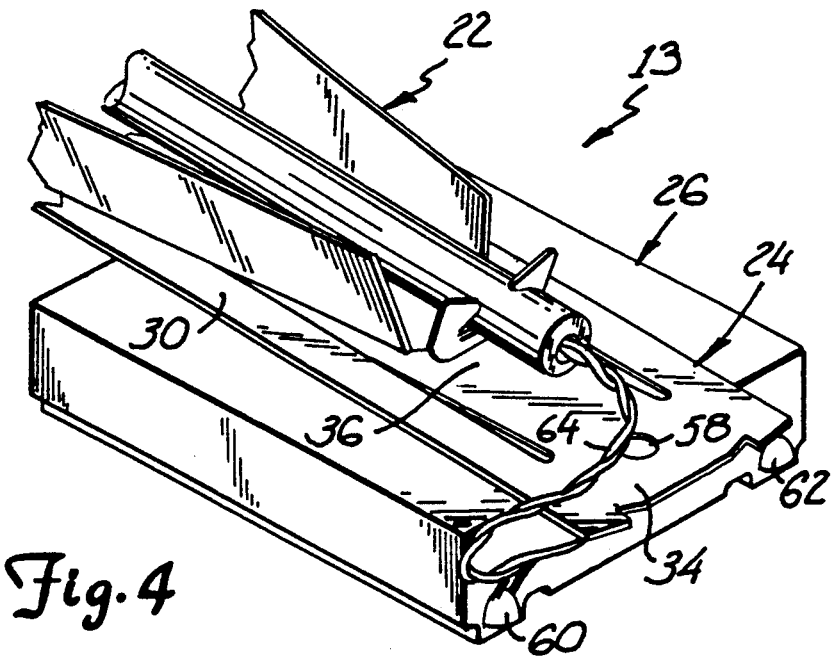
FIG. 4 is an enlarged perspective view of the load beam supporting the slider-gimbal assembly.

FIG. 4 is an enlarged perspective view of load beam 22 which supports slider-gimbal assembly 13. Gimbal spring 24 includes elongated member 30, forward portion 34, tongue 36, and aperture 58. Load arm 22 is secured to elongated member 30. Slider 26 is adhesively connected to tongue 36 and carries magnetic transducers 60 and 62. Transducers 60 and 62 communicate with individual data bit locations within data tracks on magnetic disk 16 (not shown). Electrodes 64 provide electrical signals to transducers 60 and 62 for performing read and write operations on disk 16.

Figure 5:
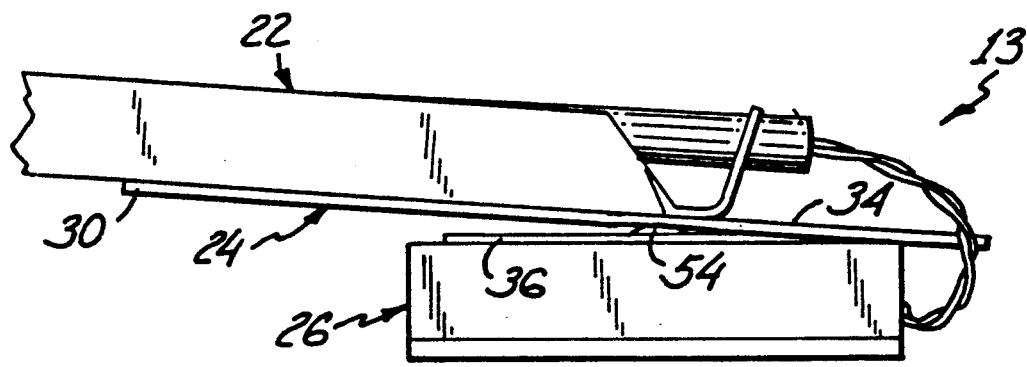
FIG. 5 is a view in side elevation of the load beam and the slider-gimbal assembly.

FIG. 5 is a side elevation view of load beam 22 and slider-gimbal assembly 13. Slider-gimbal assembly 13 includes slider 26 and gimbal spring 24. Elongated member 30 of gimbal spring 24 is riveted to load beam 22. Slider 26 is secured to tongue 36 by an adhesive connection. Once slider-gimbal assembly 13 is secured to load beam 22, dimple 54 forces tongue 36 and slider 26 downward and into a "loaded" position. In the loaded position, dimple 54 provides a pivot about which slider 26 can pitch and roll while it follows the topography of disk 16.

Figure 6:
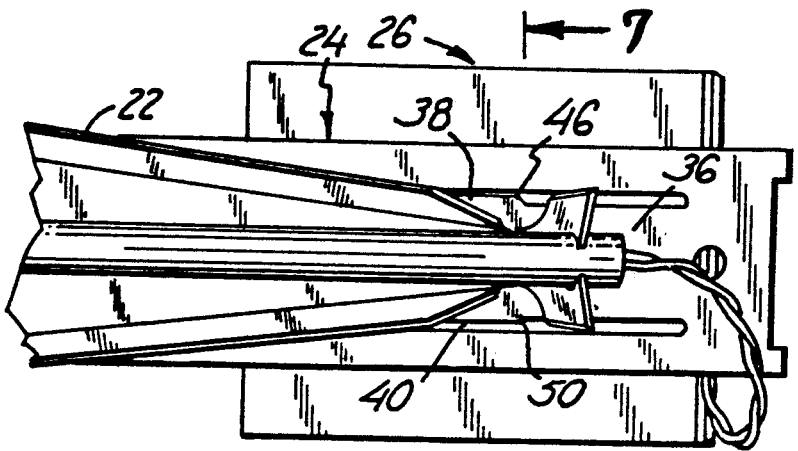
FIG. 6 is a top plan view of the load beam and the slider-gimbal assembly.

FIG. 6 is a top plan view of slider-gimbal assembly 13 secured to load beam 22. Slider-gimbal assembly 13 includes slider 26 and gimbal spring 24. Gimbal spring 24 includes tongue 36 with tabs 38 and 40. Tab 38 has corners 46 and 48 (48 not shown). Tab 40 has corners 50 and 52 (52 not shown). Corners 46, 48, 50 and 52 are canted and extend below a plane generally defined by tongue 36 to electrically contact slider 26. This is shown in more detail in FIG. 7.

Figure 7:
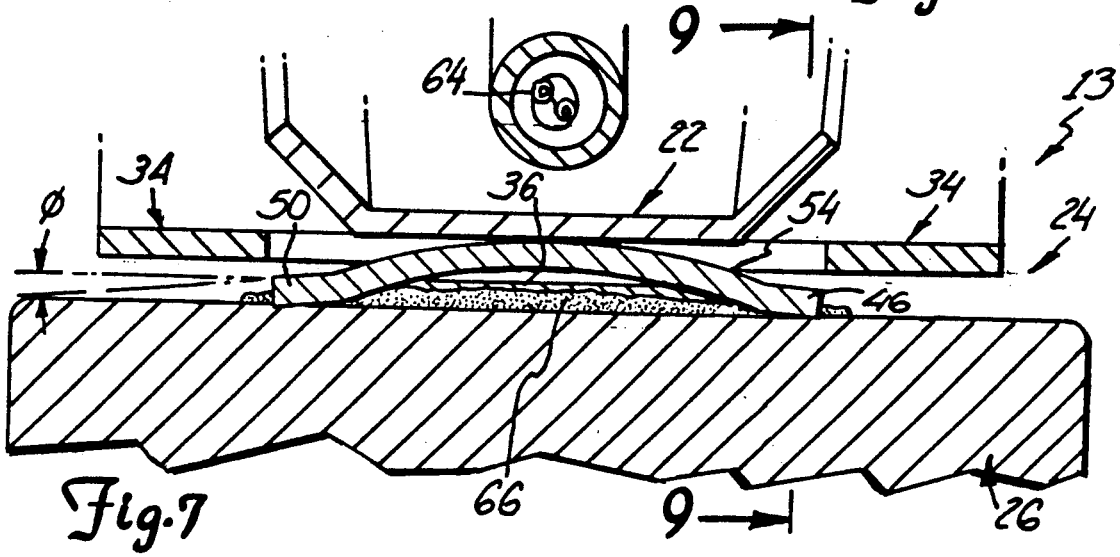
FIG. 7 is a sectional view of the load beam and the slider-gimbal assembly taken along line 7—7 of FIG. 6.

FIG. 7 is a traverse section of slider-gimbal assembly 13 taken along line 7—7 of FIG. 6. Slider-gimbal assembly 13 includes gimbal spring 24 and slider 26. Gimbal 24 is secured to load beam 22 in the loaded position and includes forward portion 34 and tongue 36. Tongue 36 includes dimple 54 and corners 46, 48, 50 and 52 (48 and 52 not shown). Dimple 54 is in point contact with load beam 22. Slider 26 is secured to tongue 36 by adhesive connection 66. Corners 46, 48, 50 and 52 extend out from dimple 54 on tongue 36 at an acute angle φ. Angle φ preferably ranges from about 4° to about 10°. In a preferred embodiment, angle φ is about 5°. Corners 46, 48, 50 and 52 extend through adhesive connection 66 and are in point contact with slider 26 to thereby electrically ground slider 26 to gimbal 24.

If slider 26 is not grounded, electrostatic charge accumulates on the slider as disk 16 (shown in FIG. 1) rotates. The contacts between slider 26 and corners 46, 48, 50 and 52 provide conduction paths from slider 26 to gimbal 24 for grounding or discharging the electrostatic charge. The conduction paths effectively eliminate charge accumulation.

Figure 8:
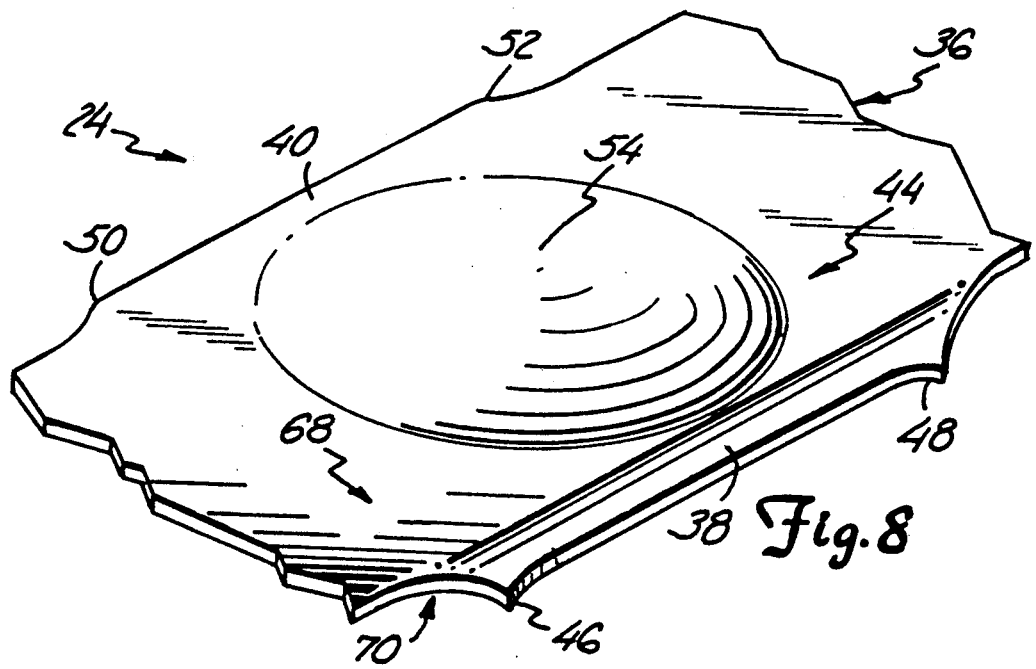
FIG. 8 is a greatly enlarged fragmentary detail of a portion of the gimbal of FIG. 2 illustrating tabs having canted corners.

FIG. 8 is a greatly enlarged fragmentary detail of a portion of gimbal spring 24 as described in FIGS. 1-7. Gimbal spring 24 includes tongue 36 having central pad 44. Central pad 44 includes dimple 54 and tabs 38 and 40. Tab 38 has corners 46 and 48. Tab 40 has corners 50 and 52. Corners 46, 48, 50 and 52 are canted and extend below a plane generally defined by tongue 36. In other words, corners 46, 48, 50 and 52 are "bowed" in the same general direction as dimple 54.

During manufacture, gimbal 24 is etched flat from a material such as stainless steel and then stamped on a die (not shown) to form tongue 36, central pad 44 and dimple 54. Tongue 36 has an upper surface 68 and a lower surface 70. The die stamps central pad 44 such that dimple 54 extends out from upper surface 68 and corners 46, 48, 50 and 52 extend below lower surface 70.

Figure 9:
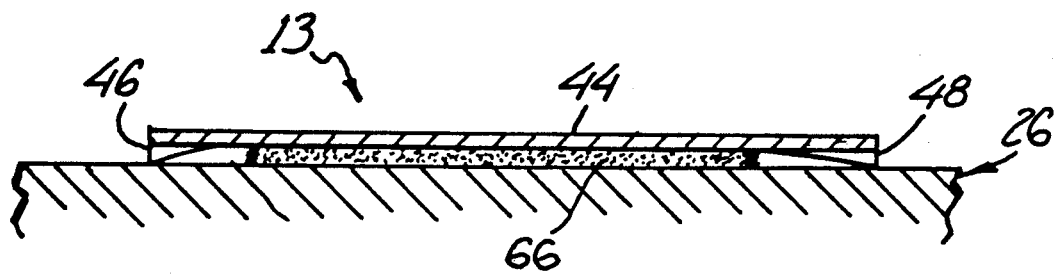
FIG. 9 is a greatly enlarged fragmentary detail of a portion of the slider-gimbal assembly of FIG. 5 illustrating the canted corners contacting a slider.

FIG. 9 is a greatly enlarged fragmentary detail of slider-gimbal assembly 13 as shown in FIGS. 5 and 7. Corners 46 and 48 extend from central pad 44 and past adhesive connection 66 to contact slider 26. These contacts form electrical conduction paths between slider 26 and gimbal spring 24 to eliminate build-up of electrostatic charge on slider 26.

Figure 10:
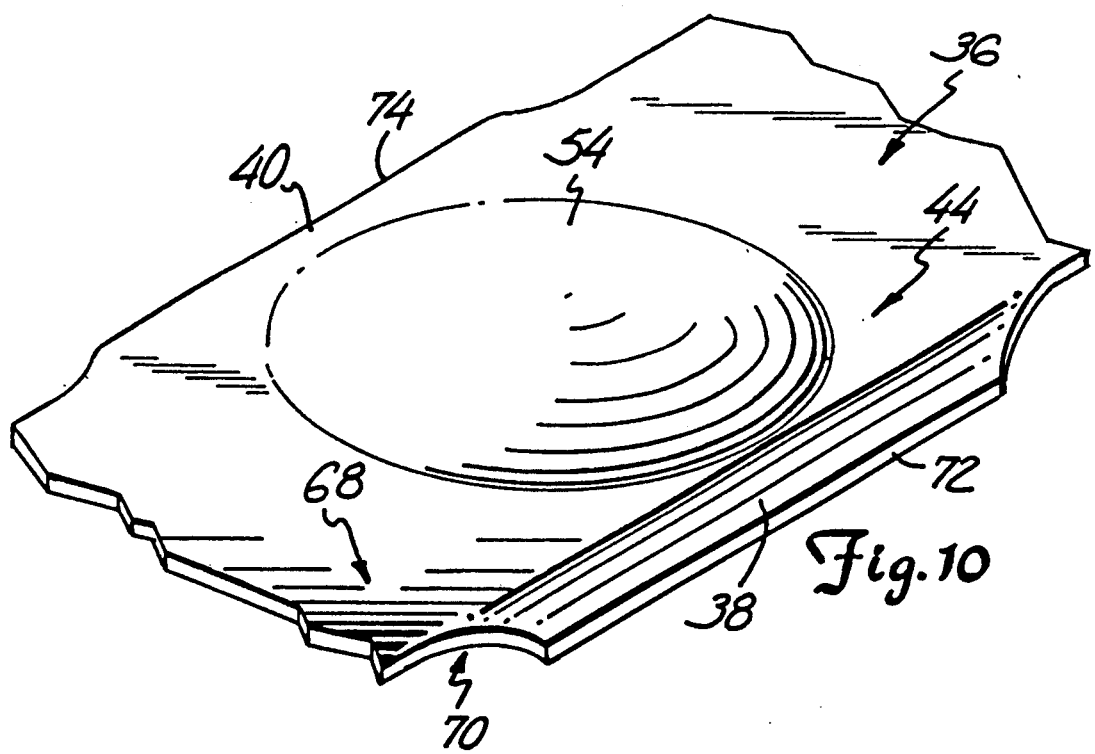
FIG. 10 is a fragmentary detail of an alternative embodiment similar to FIG. 8 but illustrating the tabs having an entire edge bent out of plane.

FIG. 10 is a greatly enlarged fragmentary detail similar to FIG. 8 but illustrating an alternative embodiment of tabs 38 and 40. Tabs 38 and 40 include edges 72 and 74, respectively. Edges 72 and 74 are bent out of plane with respect to the plane generally defined by tongue 36. Edges 72 and 74 extend below lower surface 70 of tongue 36 for extending through an adhesive connection as shown in FIG. 11.

Figure 11:
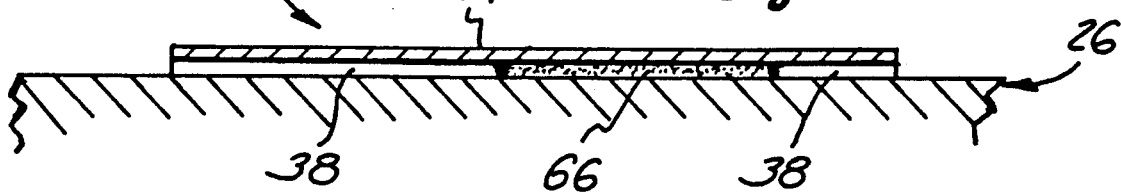
FIG. 11 is a greatly enlarged fragmentary detail similar to FIG. 9 but illustrating the alternative embodiment of FIG. 10 having the entire edge of the tab contacting the slider.

FIG. 11 illustrates edge 38 extending from central pad 44 and contacting slider 26. Portions of edge 38 are broken away to expose adhesive connection 66. Edge 38 extends through adhesive connection 66 to form an electrical conduction path from slider 26 to gimbal spring 24. During manufacture, edges 38 and 40 are bent by a die stamp.

In the prior art, securing a slider to a gimbal required extra manufacturing steps to create each conduction bond. These extra steps increased the cost of building magnetic disk drives. The gimbal of the present invention provides a simple electrostatic discharge path when secured to a transducer by an adhesive connection. The present invention eliminates the need for bridging the adhesive with conductive bonds.

Although the present invention has been described with reference to preferred embodiments, workers skilled in the art will recognize that changes may be made in form and detail without departing from the spirit and scope of the invention. For example, the gimbal spring in accordance with the present invention may be used on a linear actuator. The linear actuator positions the transducer along a linear axis from the center of the disk to its outer edge. Also, the size and shape of the tabs may be varied.

What is claimed is:

1. In a gimbal spring apparatus of the type having a cantilevered tongue which includes at least one side edge, a planar mounting surface for an adhesive connection to a magnetic disk head slider, and an upper surface having a dimple protrusion for point contact with a load beam, the upper surface being opposite to the mounting surface, an improvement comprising:

tab means extending from the side edge and positioned generally adjacent the dimple, the tab means extending below a geometric plane defined by the planar mounting surface to extend through the adhesive connection for electrical contact with the magnetic disk head slider to provide an electrical discharge path from the magnetic disk head slider to the gimbal spring.

2. The improvement of claim 1 wherein the side edge is formed integral with the tab means, the tab means being bent to form an acute angle between the tab means and the geometric plane defined by the planar mounting surface.

3. The improvement of claim 2 wherein the angle is between about four degrees and about ten degrees.

4. The improvement of claim 2 wherein the tab means comprises at least one edge in electrical contact with the magnetic disk head slider.

5. The improvement of claim 1 wherein the tab means comprises at least one corner in electrical contact with the magnetic disk head slider.

6. A gimbal spring configured for adhesive connection to a disk head slider in a magnetic disk drive unit, the gimbal spring comprising:
   an elongated member having forward and rearward portions, the forward portion having a central region;
   a cantilevered tongue cut out of the forward portion within the central region, the tongue having a central pad connected to the slider by the adhesive connection and having a dimple protrusion and at least one integral projection with at least one canted corner extending through a plane generally defined by the pad and extending through the adhesive connection to make physical and electrical contact with the slider.

7. The gimbal spring of claim 6 wherein the canted corner extends below the plane generally defined by the central pad to form an acute angle between the corner and the plane, the angle being between about four degrees and about ten degrees.

8. The gimbal spring of claim 6 wherein the central pad comprises two integral projections, each projection having two canted corners.

9. A magnetic transducer assembly comprising:
   an actuator arm;
   a magnetic disk head slider carrying a magnetic transducer;
   a gimbal spring having an elongated member and a cantilevered tongue, the elongated member secured to the actuator arm and the cantilevered tongue bonded to the slider by an adhesive for resiliently supporting the slider and transducer proximate a rotating magnetic disk, the tongue having at least one canted corner extending through the adhesive and contacting the slider to provide an electrostatic discharge path from the slider to the gimbal spring.

10. The magnetic transducer assembly of claim 9 wherein the tongue includes a central pad having four canted corners, each corner extending through the adhesive connection and contacting the slider.

11. The magnetic transducer assembly of claim 9 wherein the corner is canted at an angle that is between about four degrees and about ten degrees with respect to a plane generally defined by the tongue.

12. The magnetic transducer assembly of claim 9 wherein the adhesive is a nonconductive epoxy.

13. A method of assembling a slider-gimbal assembly, the method comprising:
   providing a gimbal spring having a central pad with at least one integral projection having at least one canted corner, so that the canted corner extends below a plane generally defined by the central pad; and
   securing the gimbal spring to a magnetic disk head slider with an adhesive so that the canted corner extends through the adhesive and electrically contacts the slider.

14. The method of claim 13 wherein the step of providing a gimbal spring includes providing a gimbal spring having a central pad with at least one integral projection having at least one corner canted at an angle between about 4° and about 10°.

15. The method of claim 13 wherein the step of securing the gimbal spring with an adhesive includes securing the gimbal spring with a non-conductive epoxy.

16. A gimbal spring configured for adhesive connection to a disk head slider in a disk drive unit, the gimbal spring comprising a pad connected to the slider by the adhesive connection and having at least one integral projection with at least one canted corner extending through a plane generally defined by the pad and extending through the adhesive connection to make physical and electrical contact with the slider.

17. The gimbal spring of claim 16 wherein the canted corner extends below the plane generally defined by the pad to form an acute angle between the corner and the plane, the angle being between about four degrees and ten degrees.

18. The gimbal spring of claim 16 wherein the pad comprises two integral projections, each projection having two canted corners.

* * * * *